United States Patent
Madsen

(10) Patent No.: US 10,020,747 B2
(45) Date of Patent: Jul. 10, 2018

(54) RESONANT DC-DC POWER CONVERTER ASSEMBLY

(71) Applicant: Danmarks Tekniske Universitet, Kgs. Lyngby (DK)

(72) Inventor: Mickey P. Madsen, Kgs. Lyngby (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 0 days.

(21) Appl. No.: 15/126,384

(22) PCT Filed: Apr. 14, 2015

(86) PCT No.: PCT/EP2015/058041
§ 371 (c)(1),
(2) Date: Sep. 15, 2016

(87) PCT Pub. No.: WO2015/158699
PCT Pub. Date: Oct. 22, 2015

(65) Prior Publication Data
US 2017/0085189 A1    Mar. 23, 2017

(30) Foreign Application Priority Data
Apr. 15, 2014 (EP) ..................... 14164749

(51) Int. Cl.
*G05F 1/00* (2006.01)
*H02M 3/335* (2006.01)
(Continued)

(52) U.S. Cl.
CPC ......... *H02M 3/33546* (2013.01); *H02M 1/14* (2013.01); *H02M 1/44* (2013.01);
(Continued)

(58) Field of Classification Search
CPC .............. Y02B 70/1433; Y02B 70/126; Y02B 70/1425; H02M 1/4241; H02M 1/4225;
(Continued)

(56) References Cited

U.S. PATENT DOCUMENTS 6,970,366 B2    11/2005   Apeland et al.
7,786,681 B2     8/2010   Inoue et al.
(Continued)

OTHER PUBLICATIONS

Aigner, H. et al., "Parallel/Series Connection of Self-Sustained Oscillating Series-Parallel Resonant Converters" Power Electronics and Applications (EPE 2011), Proceedings of the 2011—14th European Conference, Aug. 30-Sep. 1, 2011.
(Continued)

*Primary Examiner* — Alex Torres-Rivera
(74) *Attorney, Agent, or Firm* — Knobbe, Martens, Olson & Bear, LLP

(57) ABSTRACT

The present invention relates to a resonant DC-DC power converter assembly comprising a first resonant DC-DC power converter and a second resonant DC-DC power converter having identical circuit topologies. A first inductor of the first resonant DC-DC power converter and a second inductor of the second resonant DC-DC power converter are configured for magnetically coupling the first and second resonant DC-DC power converters to each other to forcing substantially 180 degrees phase shift, or forcing substantially 0 degree phase shift, between corresponding resonant voltage waveforms of the first and second resonant DC-DC power converters. The first and second inductors are corresponding components of the first and second resonant DC-DC power converters.

15 Claims, 6 Drawing Sheets

(51) Int. Cl.
*H02M 3/338* (2006.01)
*H02M 7/5383* (2007.01)
*H02M 1/14* (2006.01)
*H02M 1/44* (2007.01)
*H02M 3/155* (2006.01)
*H02M 1/00* (2006.01)
*H02M 3/158* (2006.01)
*H02M 7/48* (2007.01)

(52) U.S. Cl.
CPC ......... *H02M 3/338* (2013.01); *H02M 7/5383* (2013.01); *H02M 2001/0058* (2013.01); *H02M 2001/0064* (2013.01); *H02M 2003/1557* (2013.01); *H02M 2003/1586* (2013.01); *H02M 2007/4815* (2013.01); *Y02B 70/1425* (2013.01); *Y02B 70/1433* (2013.01); *Y02B 70/1441* (2013.01); *Y02B 70/1491* (2013.01)

(58) Field of Classification Search
CPC ....... H02M 1/4233; H02M 2007/4815; H02M 7/4826; H02M 2003/1586; H02M 2003/1557; H02M 7/538
USPC ................... 323/207, 272; 363/21.02, 21.03
See application file for complete search history.

(56) References Cited

U.S. PATENT DOCUMENTS

| | | | | |
|---|---|---|---|---|
| 7,893,669 | B2* | 2/2011 | Osterhout | H02M 3/1584 323/272 |
| 8,558,525 | B1 | 10/2013 | Jain et al. | |
| 2008/0190906 | A1* | 8/2008 | Aigner | H02M 3/335 219/130.21 |
| 2010/0123450 | A1 | 5/2010 | Reddy et al. | |
| 2011/0002445 | A1 | 1/2011 | Hattrup et al. | |
| 2011/0051468 | A1 | 3/2011 | Kyono | |
| 2011/0127976 | A1* | 6/2011 | Hiltbrunner | H02M 3/1584 323/272 |
| 2012/0300504 | A1 | 11/2012 | Ye et al. | |
| 2013/0250623 | A1 | 9/2013 | Xu et al. | |

OTHER PUBLICATIONS

Chen, Feng-Yin et al., "A Novel Self-Oscillating, Boost-Derived DC-DC Converter With Load Regulation" IEEE Transactions on Power Electronics, Jan. 2005, pp. 65-74, vol. 20, No. 1.

Katayama, Motoki et al., "An Interleaved Class $E^2$ dc/dc Converter Converter" Circuits and Systems, 2008, ISCAS 2008, IEEE International Symposium on, May 18, 2008, pp. 2833-2836.

Kovacevic, Milovan et al., "Very High Frequency Interleaved Self-Oscillating Resonant SEPIC Converter" Technical University of Denmark, XP-002730533.

Kovacevic, Milovan et al., "VHF Series-Input Parallel-Output Interleaved Self-Oscillating Resonant SEPIC Converter" 2013 IEEE Energy Conversion Congress and Exposition, Sep. 1, 2013, pp. 2052-2056, XP-055143206.

Lin, Ray-Lee et al., "Self-Oscillating Push-Pull Class-E/F Converters Converters" Circuits and Systems, The 2004 IEEE Asia-Pacific Conference on Tainan, Taiwan Dec. 6-9, 2004, pp. 649-652, vol. 2.

Madsen, Mickey P. et al., "Self-Oscillating Resonant Gate Drive for Resonant Inverters and Rectifiers Composed Solely of Passive Components" 2014 IEEE Applied Power Electronics Conference and Exposition—APEC 2014, IEEE, Mar. 16, 2014, pp. 2029-2035.

International Search Report for PCT/EP2015/058041 dated Jun. 19, 2015.

* cited by examiner

RESONANT DC-DC POWER CONVERTER ASSEMBLY

CROSS REFERENCE TO RELATED APPLICATIONS

This application is a U.S. National Phase Application of PCT International Application Number PCT/EP2015/058041, filed on Apr. 14, 2015, designating the United States of America and published in the English language, which is an International Application of and claims the benefit of priority to European Patent Application No. 14164749.5, filed on Apr. 15, 2014. The disclosures of the above-referenced applications are hereby expressly incorporated by reference in their entireties.

The present invention relates to a resonant DC-DC power converter assembly comprising a first resonant DC-DC power converter and a second resonant DC-DC power converter having identical circuit topologies. A first inductor of the first resonant DC-DC power converter and a second inductor of the second resonant DC-DC power converter are configured for magnetically coupling the first and second resonant DC-DC power converters to each other to forcing substantially 180 degrees phase shift, or forcing substantially 0 degree phase shift, between corresponding resonant voltage waveforms of the first and second resonant DC-DC power converters. The first and second inductors are corresponding components of the first and second resonant DC-DC power converters.

BACKGROUND OF THE INVENTION

Power density and component costs are key performance metrics of both isolated and non-isolated DC-DC power converters to provide the smallest possible physical size and/or lowest costs for a given output power requirement or specification. Resonant power converters are particularly useful for high switching frequencies such as frequencies above 1 MHz where switching losses of standard SMPS topologies (Buck, Boost etc.) tend to be unacceptable for conversion efficiency reasons. High switching frequencies are generally desirable because of the resulting decrease of the electrical and physical size of circuit components of the power converter like inductors and capacitors. The smaller components allow increase of the power density of the DC-DC power converter. In a resonant power converter an input "chopper" semiconductor switch (often MOSFET or IGBT) of the standard SMPS is replaced by a "resonant" semiconductor switch. The resonant semiconductor switch relies on resonances of a resonant network typically involving various circuit capacitances and inductances to shape the waveform of either the current or the voltage across the semiconductor switch such that, when state switching takes place, there is no current through or no voltage across the semiconductor switch. Hence power dissipation is largely eliminated in at least some of the intrinsic capacitances or inductances of the input semiconductor switch such that a dramatic increase of the switching frequency into the VHF range becomes feasible for example to values above 30 MHz. This concept is known in the art under designations like zero voltage and/or zero current switching (ZVS and/or ZCS) operation. Commonly used switched mode power converters operating under ZVS and/or ZCS are often described as class E, class F or class DE inverters or power converters.

However, it remains a significant challenge to find suitable switching devices which can operate at switching frequencies in the VHF range and handle necessary device voltages and currents to produce the required output power to the converter load. One way to attack this challenge is to use multiple resonant DC-DC power converters with lower individual output power capability and connect these in parallel and/or series to reduce the maximum output power requirement imposed on any single resonant DC-DC power converter. If a pair of these resonant DC-DC power converters with lower output power capability is controlled so they operate with a 180 degrees phase shift several new advantages of this stacked converter configuration arises. Input ripple voltage is reduced as ripple voltages from the pair of lower power resonant converters will at least partially cancel each other. This cancellation effect reduces the need for input filtering and thereby lowers the component costs of the resonant power converter and reduces EMI emission. Furthermore, voltage ripple on the converter output voltage will also at least partially be cancelled leading to the same benefits on the output side of the resonant DC-DC power converter. The 180 degrees phase shift is normally achieved by controlling the drive signal on switch control terminals of all the switches of the pair of DC-DC power converters to produce the appropriate phase shift. This control scheme leads to a requirement for digital or advanced analog control circuitry which introduce a substantial increase of complexity of the DC-DC power converter.

The IEEE paper "VHF SERIES-INPUT PARALLEL-OUTPUT INTERLEAVED SELF-OSCILLATING RESONANT SEPIC CONVERTER", Proceedings of ECCE, USA 2013, page 2052-2056 discloses two resonant so-called SEPIC power converters that are capacitively coupled together so the drain voltage of a MOSFET switch of a first converter drives the gate of another MOSFET switch of a second converter. The two resonant SEPIC converters may operate with a phase-shift of 180° (interleaved operation).

US 2012/0300504 A1 discloses a DC-DC converter circuit comprising a plurality of in parallel coupled resonant power converters operating in interleaved mode. The respective outputs of the plurality of resonant power converters are paralleled and the inputs are coupled in series via a capacitive divider. The plurality of parallel coupled resonant power converters are operating at the substantially same switching frequency and with some phase shift between them. The latter feature provides a lower ac current through an output capacitor.

In view of these problems and challenges associated with prior art operation of multiple serially or in parallel coupled resonant DC-DC power converters, it would be advantageous to provide a low complexity and low cost control mechanism and control device that would force multiple interconnected resonant DC-DC power converters to operate with 180 degrees phase shift, or operate with 0 degree phase shift, and thereby take advantage of the above-mentioned benefits of reduced EMI emission and lower components costs.

SUMMARY OF THE INVENTION

A first aspect of the invention relates to a resonant DC-DC power converter assembly comprising a first resonant DC-DC power converter and a second resonant DC-DC power converter having identical circuit topologies. A first inductor of the first resonant DC-DC power converter and a second inductor of the second resonant DC-DC power converter are configured for magnetically coupling the first and second resonant DC-DC power converters to each other to force substantially 180 degrees phase shift, or forcing substantially 0 degree phase shift, between corresponding resonant voltage waveforms of the first and second resonant DC-DC power converters. The first and second inductors are corresponding components of the first and second resonant DC-DC power converters.

The skilled person will understand that the definition of the first and second inductors as corresponding components or elements of the first and second resonant DC-DC power converters means that the first inductor is arranged at the same position of the circuit topology of the first resonant DC-DC power converter as the second inductor is arranged in the circuit topology of the second resonant DC-DC power converter. The first and second inductors therefore have the same function in the first and second resonant DC-DC power converters.

The skilled person will understand that the first and second inductors in one set of embodiments are configured for magnetically coupling the first and second resonant DC-DC power converters to each other by forcing substantially 0 degree phase shift between corresponding resonant voltage waveforms of the first and second resonant DC-DC power converters. These 0 degree phase shift, or "in-phase", embodiments of the present resonant DC-DC power converter assembly are useful because the magnetic coupling between the first and second resonant DC-DC power converters forces their switching frequencies to be substantially identical and locked to each other, i.e. forcing synchronous operation of the first and second resonant DC-DC power converters. The synchronous operation enforced by the magnetic coupling between the first and second inductors eliminates or at least attenuates sum and difference switching frequency components otherwise inherently generated by small phase and switching frequency differences or offsets between a pair of nominal identical, but unlocked or asynchronous, resonant DC-DC power converters. The sum and difference switching frequency components lead to undesirable EMI emissions at frequencies far away from the nominal switching frequencies of the first and second resonant DC-DC power converters. These inherent phase offsets and switching frequency offsets are caused by manufacturing tolerances between nominally identical active and passive components of the first and second resonant DC-DC power converters, aging effects, temperature drift etc. Furthermore, the first and second resonant DC-DC power converters of the "in-phase" embodiments of the resonant DC-DC power converter assembly are capable of sharing a single rectification circuit, and optionally a resonant inductor, leading to a lower component count, smaller size and lower manufacturing costs etc. as discussed in further detail below.

The skilled person will understand that the first and second inductors in another set of embodiments are configured for magnetically coupling the first and second resonant DC-DC power converters to each other by forcing substantially 180 degrees phase shift between corresponding resonant voltage waveforms of the first and second resonant DC-DC power converters. These 180 degrees phase shift, or "anti-phase", embodiments of the present resonant DC-DC power converter assembly share the advantages with respect to enforcing synchronous or locked operation of the first and second resonant DC-DC power converters as discussed above in respect of the in-phase embodiments of the present resonant DC-DC power converter assembly. The anti-phase embodiments of the present resonant DC-DC power converter assembly possess numerous further distinct advantages associated with the substantially 180 degrees phase difference, or phase shift, between the corresponding resonant voltage and/or current waveforms of the first and second resonant DC-DC converters. This feature leads to significant decrease of ripple voltage levels on the DC power supply voltages of the converter assembly and leads to significant suppression of EMI emissions of the converter assembly because of cancellation effects between the opposite phase relationship between corresponding circuit currents and voltages of the first and second resonant DC-DC converters. Finally, in addition to the resonant voltage and/or current waveforms other types of corresponding voltage or current waveforms of the first and second resonant DC-DC converters may be synchronous and substantially opposite phase such as ripple voltages across the respective positive and negative input terminals of the first and second converters, ripple voltages on the first and second converter output voltages.

The skilled person will understand that the resonant DC-DC power converter assembly may comprise one or more additional resonant DC-DC power converter(s) where each additional resonant DC-DC power converter comprises an inductor magnetically coupled to the first and second magnetically coupled inductors and arranged to force substantially 180 degrees phase shift, or force substantially 0 degree phase shift, between corresponding resonant voltage and/or current waveforms of the additional resonant DC-DC power converter and the resonant voltage waveform of one of the first and second resonant DC-DC power converters. The resonant DC-DC power converter assembly preferably comprises an even number of individual resonant DC-DC power converters, which pair-wise operate with the 0 or 180 degrees phase shift between corresponding resonant voltage waveforms. The latter configuration typically provides the largest reduction of the previously discussed input ripple voltage, output voltage ripple and EMI emission etc. The first and second magnetically coupled inductors and the one or more additional inductors may all be wound around a common magnetically permeable core material, with appropriate orientation of the respective inductor windings to create the required phase shift. The common magnetically permeable core material provides strong magnetic coupling between the first, second and any further inductors.

Each of the first and second resonant DC-DC power converters may comprise a galvanic isolation barrier to provide an isolated resonant DC-DC power converter assembly. This galvanic isolation barrier is preferably arranged between the input side circuit and a rectification circuit of the resonant power converter to provide galvanic isolation between the converter output voltage and the input side circuit coupled to an AC or DC input voltage source. The galvanic isolation barrier may comprise a pair of magnetically coupled inductors or a pair of capacitors as described in additional detail below with reference to the appended drawings.

The first resonant DC-DC power converter may comprise a first input side circuit comprising a positive and a negative input terminal for receipt of a first input voltage, a first controllable switch arrangement driven by a first switch control signal to set a switching frequency of the first converter and a first resonant network coupled to an output of the first controllable switch arrangement to generate alternatingly increasing and decreasing resonant current in the first resonant network in accordance with the first switch control signal. A first rectification circuit is connected to an output of the first resonant network. Likewise, the second resonant DC-DC power converter may comprise a second input side circuit comprising a positive and a negative input terminal for receipt of the first input voltage or a second input voltage, a second controllable switch arrangement driven by a second switch control signal to set a switching frequency of the second converter, a second resonant network coupled to an output of the second controllable switch arrangement to generate alternatingly increasing and decreasing resonant current in the second resonant network in accordance with the second switch control signal. The output of the second resonant network may be connected to the first rectification circuit or connected to a second rectification circuit.

The output of the second resonant network may accordingly be connected to the first rectification circuit of the first resonant DC-DC power converter such that the first rectification circuit is a shared or common circuit of the first and second resonant DC-DC power converters. This embodiment of the resonant DC-DC power converter assembly is particularly useful where the first and second inductors are configured for forcing substantially 0 degree phase shift between the corresponding resonant voltage waveforms of the first and second resonant DC-DC power converters. The in-phase relationship between the corresponding resonant voltage waveforms of the first and second resonant DC-DC power converter allows respective ac output currents of the first and second resonant networks to be combined or added constructively. This embodiment of the resonant DC-DC power converter assembly can be viewed as a combination of first and second power inverters coupled to a common or shared rectification circuit.

The resonant DC-DC power converter assembly may further comprise an output side circuit coupled to an output of the first rectification circuit; wherein the output side circuit comprises positive and negative output terminals for supply of a converter output voltage and connection to a converter assembly load.

In an alternative embodiment of the resonant DC-DC power converter assembly, the output of the second resonant network is connected to an input of a second, separate, rectification circuit of the second resonant DC-DC power converter. This embodiment is particularly useful where the first and second inductors are configured for forcing substantially 180 degrees of phase shift between the corresponding resonant voltage waveforms of the first and second resonant DC-DC power converters which makes it unfeasible to add or sum the output voltages of the first and second resonant networks. Instead, the rectified output voltages of the first and second separate rectification circuits are added.

The first controllable switch arrangement may comprise one or more semiconductor switches and the second controllable switch arrangement may comprise one or more semiconductor switches. Each of the first and second controllable switch arrangements may comprise a half-bridge inverter or a full-bridge driver. Each of the semiconductor switches may comprise a semiconductor transistor such as a MOSFET or IGBT such as a Silicon (Si), Gallium Nitride (GaN) or Silicon Carbide (SiC) MOSFET.

The first and second resonant DC-DC power converters may comprise one or more further pair(s) of magnetically coupled inductors in addition to first and second magnetically coupled inductors. A further pair of magnetically coupled inductors may be used to strengthen overall coupling between the first and second resonant DC-DC power converters by coupling additional corresponding inductors of the first and second resonant DC-DC power converters to each other as discussed below in further detail.

Each of the first and second rectification circuits may comprise a diode based rectifier with one or several semiconductor diodes connected as a half-wave or full-wave rectifier. Alternatively, each of the first and second rectification circuits may comprise a synchronous or active rectifier based on actively controlled transistors. The rectification circuit is preferably designed to exhibit substantially resistive impedance at a resonance frequency of the resonant network with connected converter assembly load.

The frequencies of the first and second switch control signals, setting the switching frequencies of the first and second resonant DC-DC power converter, respectively, may be set to a frequency at or above 20 MHz, for example in the so-called VHF range at or above 30 MHz. The switching frequencies of the first and second switch control signals of the converter assembly are substantially identical for the reasons discussed above. A resonance frequency of each of the first and second resonant networks is preferably situated in proximity of the selected switching frequencies of the first and second resonant DC-DC power converters. The first and second resonant DC-DC power converters are preferably configured to provide zero voltage and/or zero current switching of the semiconductor switch or switches of the first and second controllable switch arrangements.

Generally, the first and second input side circuits may be coupled in series to divide the input voltage delivered by the DC or AC voltage source of the converter assembly or the first and second input side circuits may be coupled in parallel to share a common input voltage delivered by the DC or AC voltage source of the converter assembly. Hence, in the latter embodiment, the positive and negative input terminals of the first resonant DC-DC power converter and the positive and negative input terminals of the second resonant DC-DC power converter are coupled in parallel to the common DC input voltage source. Conversely, in the former embodiment, the positive and negative input terminals of the first resonant DC-DC power converter and the positive and negative input terminals of the second resonant DC-DC power converter may be connected in series across the common DC input voltage source of the converter assembly. In both coupling cases, each of the first and second input side circuits may comprise an input or filter capacitor coupled between the positive and negative input terminals.

Generally, the first and second output side circuits may be coupled in series or in parallel to the converter assembly load independent of whether the first and second input side circuits are coupled in series or parallel. Consequently, the positive and negative output terminals of the first resonant DC-DC power converter and the positive and negative output terminal of the second resonant DC-DC power converter may be coupled in series across the converter assembly load. Hence, the output voltage of the converter assembly is doubled or increased to the sum of the first and second converter output voltages in the series coupled configuration of the outputs. In the opposite case, the positive and negative output terminals of the first resonant DC-DC power converter and the positive and negative output terminals of the second resonant DC-DC power converter are coupled in parallel to the converter assembly load. In both coupling cases, each of the first and second output side circuits may comprise an output or smoothing capacitor coupled between the positive and negative output terminals to reduce voltage ripple of the rectified voltages supplied by the first and second rectification circuits.

The first and second magnetically coupled inductors may be arranged in various corresponding circuit portions of the first and second resonant DC-DC power converters to provide the advantageous coupling between the first and second power converters. The skilled person will understand that the electrical characteristics of the corresponding active components, such as semiconductor switches or transistors, and passive components, such as resistors, capacitors and inductors, of first and second resonant DC-DC power converters preferably are nominally identical, but may deviate in practice due to unavoidable manufacturing tolerances, temperature drift etc. The first inductor may form part of the first resonant network of the first resonant DC-DC power converter and second inductor may form part of the second resonant network of the second resonant DC-DC power converter to force substantially 180 degrees phase shift, or force substantially 0 degree phase shift, between output voltage waveforms of the first and second controllable switch arrangements. The output voltage waveforms of the first and second controllable switch arrangements may be drain voltages of MOSFET switches of class E power converters or SEPIC power converters. The first and second inductors may comprise respective input inductors of the first and second class E power converters or first and second SEPIC power converters. In one embodiment of the latter SEPIC based converter assembly, the first inductor of the first resonant network is arranged between the positive input terminal and the output of the first controllable switch arrangement of the first resonant DC-DC power converter and the second inductor of the second resonant network is arranged between the positive input terminal and the output of the second controllable switch arrangement of the second resonant DC-DC power converter. In an alternative embodiment of the latter SEPIC based converter assembly, the first and second input side circuits are placed in series across the DC or AC input voltage source such that the first inductor of the first resonant network is arranged between the positive input terminal of the first resonant DC-DC power converter and the second inductor of the second resonant network is arranged between the negative input terminal of the first resonant DC-DC power converter and the positive input terminal of the second resonant DC-DC power converter.

In another embodiment of the present power converter assembly, the first and second inductors are arranged in series with respective control terminals, for example gate terminals of first and second MOSFET switches, of the first and second controllable switch arrangements to force a substantially 180 degrees phase shift, or force substantially 0 degree phase shift, between the first switch control signal and the second switch control signal. Hence, the opposite phase relationship, or in-phase relationship, between the first and second switch control signals which drives the switching frequencies of the resonant power converters forces all further pairs of corresponding resonant voltage waveforms, and corresponding pairs resonant current waveforms, of the first and second resonant DC-DC power converters into the same phase relationship.

An advantageous embodiment of the resonant DC-DC power converter assembly comprises one or more additional pair(s) of magnetically coupled inductors in addition to the previously discussed first and second magnetically coupled inductors of the first and second resonant DC-DC power converters. According to this embodiment of the converter assembly, the first and second resonant DC-DC power converters comprises corresponding third and fourth inductors; and the third and fourth corresponding inductors being magnetically coupled to each other to force substantially 180 degrees phase shift, or forcing substantially 0 degree phase shift, between corresponding voltage and/or current waveforms of the third and fourth inductors. The skilled person will understand that third and fourth inductors are corresponding components or elements of the first and second resonant DC-DC power converters as discussed above in connection with the properties of the first and second inductors. The magnetic coupling between multiple pairs, i.e. two or more pairs, of corresponding inductors of the first and second resonant DC-DC power converters improves the overall coupling between the first and second resonant DC-DC power converters. This is a particularly advantageous feature for resonant DC-DC power converter assemblies operating at very high switching frequencies at or above 20 MHz, such as switching frequencies in the VHF range at or above 30 MHz, for the reasons discussed in detail below for example with reference to FIG. 4 of the appended drawings.

At least one of the first and second resonant DC-DC power converters may comprise a self-oscillation feedback loop to provide at least one self-oscillating resonant DC-DC power converter in the converter assembly. Different types of self-oscillation feedback loops may be applied as discussed below. In one such embodiment, the first resonant DC-DC power converter comprises a first self-oscillation feedback loop; and the second resonant DC-DC power converter comprises an output voltage regulation loop generating the second switch control signal to adjust an output voltage across the converter assembly load. The second resonant DC-DC power converter may be a non-self-oscillating type of power converter driven by a traditional switch control signal. The second switch control signal may for example comprise a frequency modulated control signal such that frequency control is used to adjust the output voltage across the converter assembly load to a desired DC voltage level. The output voltage regulation loop may comprise one or more a suitable DC reference voltage(s) and for example a feedback control loop. The self-oscillating property of the first resonant DC-DC power converter allows the latter to track or follow the operation of the second resonant DC-DC power converter as a kind of slave circuit due to the previously discussed coupling between the first and resonant DC-DC power converters as described in further detail below with reference to the appended drawings.

In the alternative each of the first and second resonant DC-DC power converters may be a self-oscillating power converter. In one such embodiment, the first resonant DC-DC power converter comprises a first self-oscillation feedback loop coupled between the output of the first controllable switch arrangement and a control terminal of the first controllable switch arrangement; and the second resonant DC-DC power converter comprises a second self-oscillation feedback loop coupled between the output of the second controllable switch arrangement and a control terminal of the second controllable switch arrangement. At least one of the first and second self-oscillation feedback loops discussed above may comprise a first bias voltage source configured to generate a first adjustable bias voltage, a first inductor, preferably with substantially fixed inductance, coupled in-between the first bias voltage source and the control terminal of the first or the second controllable switch arrangement. The first and/or the second self-oscillation feedback loop(s) may rely exclusively on intrinsic switch capacitances, such as gate-drain capacitance(s) of MOSFET transistor(s), of the controllable switch arrangements to provide a suitable feedback transfer function from the output of the controllable switch arrangement to the control terminal of the controllable switch arrangement. Alternatively, the first and/or the second self-oscillation feedback loop(s) may include electric components external to the switch or switches of the controllable switch arrangements such as external capacitors and/or resistors, in addition to the intrinsic switch capacitances. The skilled person will appreciate that several resonant DC-DC power converter designs utilizing the above-described self-oscillation feedback loops around the controllable switch arrangements are disclosed in the applicant's co-pending application PCT/EP2013/072548. The skilled person will understand that the self-oscillation feedback loops disclosed therein may be utilized in each of the first and second resonant DC-DC power converters in accordance with the present invention.

It is generally desirable to obtain a high Q factor or value of each of the first and second magnetically coupled inductors to improve converter conversion efficiency, but the Q factor may nevertheless vary considerably with different embodiments of the present power converter assembly depending on construction details and constraints applicable to a particular type of inductors for a particular application. Printed circuit board (PCB) integrated inductors may have smaller Q factors than inductors formed as separate components. The first inductor preferably has a Q factor larger than 5, more preferably larger than 25, at a resonance frequency of the first resonant network. Likewise, the second inductor preferably has a Q factor larger than 5, more preferably larger than 25, at a resonance frequency of the second resonant network.

The present resonant DC-DC power converter assembly may be galvanically isolated such that DC or AC input voltage source is galvanically isolated from the converter output voltage. The resonant DC-DC power converter assembly may therefore comprise a first galvanic isolation barrier arranged between the first input side circuit and the first output side circuit; and a second galvanic isolation barrier arranged between the second input side circuit and the second output side circuit.

Each of the first and second galvanic isolation barriers may comprise a transformer which comprises a pair of magnetically coupled inductors comprising a first inductor electrically connected to the primary side circuit and a second inductor electrically connected to the output side circuit. The first and second inductors could be discrete windings both wound around a common magnetic permeable structure to form an isolation transformer. In an alternative embodiment, the first and second inductors are integrated in a printed circuit board, or other suitable carrier material, without intervening magnetic material. In yet another embodiment each of the first and second galvanic isolation barriers comprises a first capacitor coupled between the positive input terminal and the positive output terminal of each of the resonant DC-DC power converters and a second capacitor coupled in-between the negative input terminal and the negative output terminal of each of the resonant DC-DC power converters.

The skilled person will understand that each of the first and second resonant DC-DC power converters may have any resonant DC-DC power converter topology for example a converter topology selected from a group of {class E, class F, class DE} or any converter topology derived therefrom such as resonant SEPIC topology, resonant boost topology, class $\varphi_2$ topology, LLC topology or LCC topology. The same applies to each of the above-mentioned optional further or additional resonant DC-DC power converter(s).

The first and second rectification circuits are preferably designed to exhibit substantially resistive impedance at the resonance frequency of the resonant network with connected converter assembly load. In this situation, impedance characteristics, including the resonance frequency, of each of the first and second resonant networks may be determined by one or more interconnected inductors and capacitors of the resonant network in question with minimal or zero influence from components of the rectification circuit.

A further aspect of the invention relates to a multi-stage resonant DC-DC power converter assembly which comprises two or more of the previously discussed in-phase embodiments of the present resonant DC-DC power converter assemblies that are magnetically coupled to each other.

The multi-stage resonant DC-DC power converter assembly comprises a first resonant DC-DC power converter assembly and a second resonant DC-DC power converter assembly according to any of the previously discussed in-phase embodiments thereof. An inductor of the first resonant DC-DC power converter assembly is magnetically coupled to a corresponding inductor of the second resonant DC-DC power converter assembly to force substantially 180 degrees phase shift between corresponding resonant voltage or current waveforms of the first and second resonant DC-DC power converter assemblies. The output current of the shared rectification circuit of the first resonant DC-DC power converter assembly may be added to the output current of the shared rectification circuit of the second resonant DC-DC power converter assembly to form a multi-stage converter output voltage.

Pairs of corresponding inductors placed at various identical positions of the topologies of the first and second resonant DC-DC power converter assemblies may be used to implement or provide the anti-phase/out-of-phase magnetic coupling between the first and second resonant DC-DC power converter assemblies. The inductor of the first resonant DC-DC power converter assembly may for example comprise the first inductor of the first resonant DC-DC power converter and the corresponding inductor of the second resonant DC-DC power converter assembly may comprise the second inductor of the second resonant DC-DC power converter. In this embodiment, the corresponding inductors of the first and second resonant DC-DC power converters of the first resonant DC-DC power converter assembly and the first and second resonant DC-DC power converters of the second resonant DC-DC power converter assembly may all be magnetically coupled to the each other for example by being wound around a common magnetically permeable core with appropriate relative orientation as discussed in further detail below with reference to the multi-stage resonant DC-DC power converter assembly disclosed on FIG. 6 of the appended drawings.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
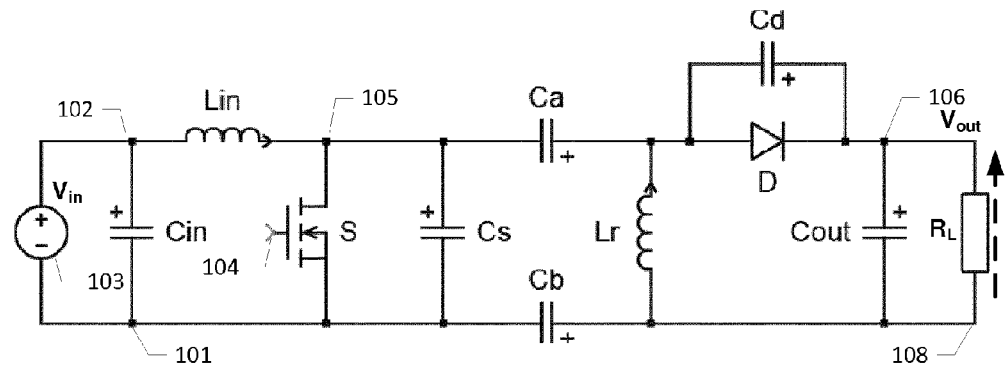
FIG. 1A) is a simplified electrical circuit diagram of a prior art isolated single-ended primary-inductor converter (SEPIC) DC-DC power converter, FIG. 1B) is a simplified electrical circuit diagram of a resonant DC-DC power converter assembly comprising first and second magnetically coupled SEPIC DC-DC power converters in accordance with a first embodiment of the invention, FIG. 2A) is a simplified electrical circuit diagram of a prior art isolated resonant class DE DC-DC power converter, FIG. 2B) is a simplified electrical circuit diagram of a resonant DC-DC power converter assembly comprising first and second magnetically coupled resonant isolated class DE DC-DC power converters in accordance with a second embodiment of the invention, FIG. 3A) shows a simplified electrical circuit diagram of an isolated class E self-oscillating resonant DC-DC power converter, FIG. 3B) shows a simplified electrical circuit diagram of a resonant DC-DC power converter assembly comprising first and second magnetically coupled isolated class E self-oscillating resonant DC-DC power converters in accordance with a third embodiment of the invention.
Figure 1:
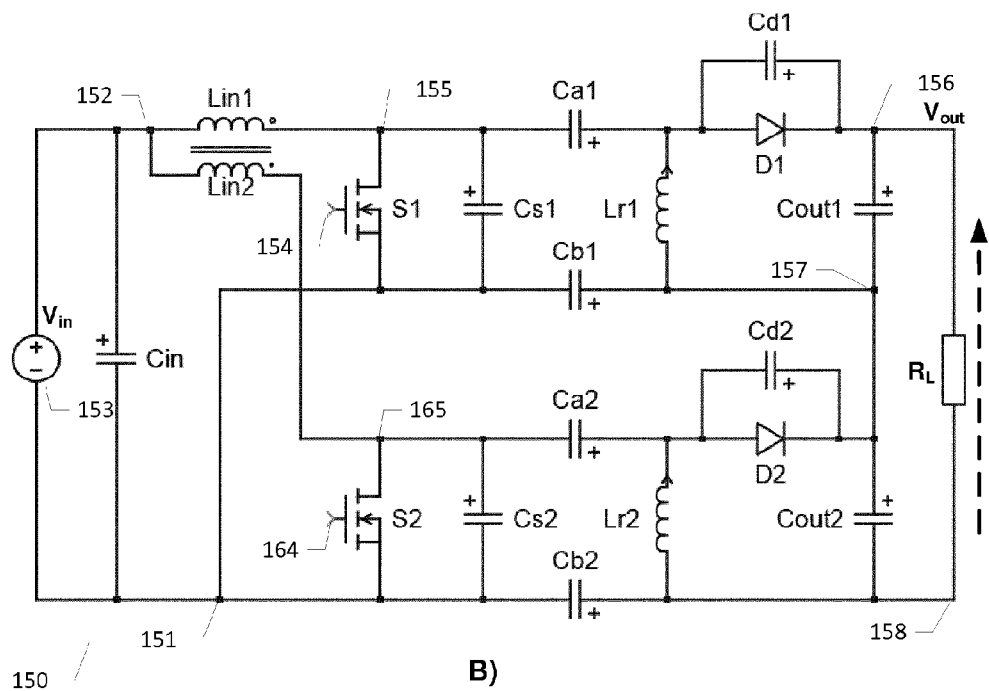

FIG. 1A) is a simplified electrical circuit diagram of a prior art isolated single-ended primary-inductor converter (SEPIC) DC-DC power converter 100. The SEPIC 100 comprises an input side circuit and an output side circuit connected through a galvanic isolation barrier formed by series or coupling capacitors Ca and Cb. The input side circuit comprises a positive input terminal 102 and a negative input terminal 101 for receipt of a DC or AC input voltage $V_{in}$ from a voltage or power source 103. An input capacitor Cin is electrically connected between the positive and negative input terminals 101, 102 to form an energy reservoir for the DC or AC input voltage source. A resonant network of the SEPIC 100 comprises at least the input inductor Lin, the capacitors Ca and Cs and possibly a second inductor Lr and capacitor Cd. The second inductor Lr and the capacitor Cd may also form part of a rectification circuit of the SEPIC 100. An output 105 of a first controllable switch arrangement, comprising a single controllable semiconductor transistor or switch S in this embodiment, is coupled to the resonant network. The controllable switch arrangement accordingly generates an alternatingly increasing and decreasing resonant current in the resonant network in accordance with a switch control signal applied to the gate or control terminal 104. The alternating current flow in the resonant network follows the switch control signal applied to the gate terminal 104 of semiconductor transistor switch S. The switch control signal forces the semiconductor transistor switch S to alternate between a conducting/on-state and a non-conducting/off-state at the frequency of the switch control signal. The frequency of the switch control signal is preferably selected such that it is situated in close proximity to a resonance frequency of the resonant network. At least a portion of the resonant current in the resonant network generated by the state switching of semiconductor transistor S is flowing from an output of the resonant network through the rectification circuit of the output side circuit of the SEPIC converter 100 to produce a rectified output voltage across a rectification capacitance Cout. The skilled person will appreciate that the residual portion of the resonant current in the resonant network may be oscillating between Cs and the input inductor Lin to allow or enable zero voltage switching (ZVS) conditions of the semiconductor transistor S. The rectification circuit comprises a rectifier inductor Lr, a diode D and a capacitor Cd coupled across the diode. Hence, the rectifier inductor Lr may form part of both the resonant network and the rectification circuit. A converter assembly load $R_L$ is connected to the generated output voltage $V_{out}$ at node 106 of the SEPIC 100 and schematically illustrated by a load resistor symbol.

FIG. 1B) is a simplified electrical circuit diagram of a resonant DC-DC power converter assembly 150 in accordance with a first embodiment of the invention comprising a pair of magnetically coupled isolated SEPIC DC-DC power converters. The resonant DC-DC power converter assembly 150 comprises a first isolated SEPIC converter built around semiconductor switch S1 and a second isolated SEPIC converter built around semiconductor switch S2. The first and second SEPIC DC-DC power converters are interconnected, or mutually coupled, via first and second magnetically coupled input inductors Lin1 and Lin2. Lin1 and Lin2 are arranged or configured to force substantially 180 degrees phase shift between resonant voltage waveform at the outputs, i.e. drain voltages in the present embodiment, of the first and second semiconductor switches S1, S2. The open dot symbol at the input inductor Lin1 and the closed dot symbol at the input inductor Lin2 indicate that the windings of these inductors are arranged to produce this opposite phase relationship between the resonant voltage or current waveforms at these terminals of the coupled inductors. The first and second SEPIC DC-DC power converters preferably possess the same circuit topology and may be substantially identical, i.e. having the same circuit topology and identical component values within practical manufacturing tolerances. Hence, the input inductors Lin1 and Lin2 are corresponding components or elements of the first and second SEPIC DC-DC power converters because they are arranged in the same position of the identical circuit topology of the first and second SEPIC DC-DC power converters. The skilled person will understand that each of the first and second isolated SEPIC converters may be substantially identical to the above-discussed prior art isolated single-ended primary-inductor converter (SEPIC) DC-DC power converter 100.

The input inductors Lin1 and Lin2 may be wound around a common magnetically permeable core material, e.g. soft iron material, to form a transformer structure. The transformer coupling of the input inductors Lin1 and Lin2 will typically lead to a high mutual magnetic coupling coefficient which is advantageous for forcing an accurate 180 degree phase shift between the drain voltages or output voltages of the first and second semiconductor switches S1, S2. In practice, the obtainable value of the mutual magnetic coupling coefficient will depend on practical constraints on the pair of magnetically coupled inductors Lin1 and Lin2 such as size, costs, winding technology. The value of the mutual magnetic coupling coefficient is nevertheless preferably larger than 0.1, even more preferably larger than 0.2, such as larger than 0.5.

However, in other embodiments of the invention a satisfactory value of the mutual magnetic coupling coefficient between the input inductors Lin1 and Lin2 may be achieved by an adjacent or interleaved arrangement of the respective coil windings without any common magnetically permeable core material for example employing the PCB integrated solenoid transformer structures disclosed in the applicant's co-pending European patent application No. 13198912.1. The inductor Lin1 is arranged between the positive input terminal 152 of the first isolated SEPIC DC-DC power converter, or first SEPIC, and the drain terminal of S1. The inductor Lin2 is in a corresponding manner arranged between the positive input terminal 152 of the second isolated SEPIC DC-DC power converter, or second SEPIC, and the drain terminal of S2. Hence, the respective input terminals of the first and second SEPICs are connected in parallel to the DC or AC input voltage $V_{in}$ produced by the input voltage source 153 placing the input sides of the SEPICs in parallel. The first SEPIC comprises a first resonant network coupled to the drain terminal of the first semiconductor switch S1. The first resonant network comprises at least the input inductor Lin1, the capacitors Ca1 and Cs1 and possibly a second inductor Lr1 and capacitor Cd1 which form part of a class E rectification circuit similar to the one discussed above. The first resonant network is driven by the drain or output 155 of the first switch S1. The capacitor Cs1, connected or arranged across the drain and source terminals of switch S1, may function to increase a resonant current and/or adjust/fine-tune the resonance frequency of the resonant network of the first SEPIC. Likewise, the capacitor Cd1, arranged across the rectifying diode D1 may be used to adjust a duty cycle of the first SEPIC. The rectification circuit is connected between an output of the first resonant network and an output node or terminal 156 which forms part of an output side circuit of the first SEPIC. The class E rectification circuit further comprises a smoothing capacitor Cout1 connected between the output node 156 and a negative supply rail 157 of the first SEPIC. The output voltage of the first SEPIC is supplied to a converter assembly load $R_L$, schematically illustrated by a load resistor symbol, in common between the first and second SEPICs. The converter assembly load $R_L$ may in practice include different types of electric loads of the resonant DC-DC power converter assembly 150 for example a set of LED diodes or a rechargeable battery etc.

The second SEPIC is preferably substantially identical to the first SEPIC and therefore comprises a corresponding input side circuit, a corresponding second semiconductor switch S2, a corresponding second resonant network and a corresponding second class E rectification circuit of an output side circuit. An output side circuit of the second SEPIC likewise comprises a smoothing capacitor Cout2 which is connected between the negative supply rail 157 of the first SEPIC and a negative terminal 158 of the converter assembly load $R_L$. The converter assembly load $R_L$ is the common load of the first SEPIC and the second SEPIC. The output voltage of the second SEPIC is accordingly supplied to the negative supply rail 157 of the first SEPIC and connected to the converter assembly load $R_L$ through the smoothing capacitor Cout1. Hence, the output side circuits, and their respective output voltages, of the first and second SEPICs are connected in series across a common converter assembly load $R_L$ and supplies on conjunction a converter assembly output voltage $V_{out}$ between positive and negative terminals 156 and 158. The negative terminal 158 of the converter assembly load $R_L$ is also the negative supply rail of the second SEPIC. This negative supply rail of the second SEPIC is galvanically isolated from the shared negative supply rail 151 of the input side circuits of the first and second SEPICs by isolation capacitor Cb2.

The first and second switch control signals for the first and second SEPICs of the converter assembly 150 are generated in different ways since only one of the SEPICs can be driven with an external "hard" switch control signal. The switch control signal for the other SEPIC is generated via a self-oscillation loop (not shown). The first switch control signal may be generated by an external source for example supplied by a suitable output voltage regulation loop or control circuit (not shown) and applied to the gate 154 of the first semiconductor switch S1. This first switch control signal determines the switching frequency of the first SEPIC (build around S1) and may for example be a frequency modulated control signal such that the switching frequency of the converter is used to adjust the converter assembly output voltage $V_{out}$ to a desired DC voltage level. The output voltage regulation loop may comprise feedback control and one or more a suitable DC reference voltage(s).

However, the self-oscillation feedback loop (not shown) of the second SEPIC is coupled between the drain or output 165 of switch S2 and the gate terminal 164 of S2 allows the second SEPIC to track or follow the operation of the first SEPIC as a slave circuit. This means that the switching frequency set by the first "hard" driven switch control signal on gate 154 is replicated to the second switch control signal on the gate terminal 164 of S2. Hence, the switching frequency of the second SEPIC becomes substantially identical and synchronous to the switching frequency of the first SEPIC. However, the corresponding resonant voltage waveforms of the first and second SEPICs, such as the drain voltage of S1 and drain voltage of S2, are 180 degrees out of phase due to the previously discussed orientation of the first and second magnetically coupled input inductors Lin1 and Lin2. This feature can be appreciated by noting that when S1 is switched on by the first "hard" driven switch control signal, S1 draws current through the first input inductor Lin1. The opposite phase coupling of Lin2 forces an oppositely directed current, with substantially same magnitude, through Lin2 which initially activates the self-oscillation feedback loop around S2 such that the second SEPIC starts to oscillate. Thereafter, the drain voltage of S2 is aligned or synchronized with the drain voltage of S1 by the current induced in the second input inductor Lin2 by the current flow in the first input inductor Lin1. The drain voltage of S2 controls in turn the second switch control signal on the gate terminal 164 of S2 because of the coupling through the self-oscillation feedback loop. Finally, the corresponding voltage waveforms of the first and second rectification circuits, in particular the first converter output voltage at the output node 156 and the second converter output voltage at the node 157, are also forced into opposite phase. This opposite phase relationship causes voltage ripple in the converter assembly output voltage across the converter assembly load to be effectively attenuated or suppressed.

The frequency of the first "hard" driven switch control signal applied to the gate terminal 154 of S1 is preferably set to a frequency at or above 30 MHz to provide so-called VHF operation of the resonant DC-DC power converter assembly. The first switch control signal may comprise a frequency modulated control signal as mentioned above. The skilled person will understand that the each of the first and semiconductor switches S1, S2 may be replaced by a switching arrangement comprising a plurality of interconnected controllable semiconductor transistors or switches in other embodiments of the invention. Each of the first and semiconductor switches S1, S2 may comprise a transistor such as a MOSFET or IGBT, for example a Gallium Nitride (GaN) or Silicon Carbide (SiC) MOSFET.

Figure 2:
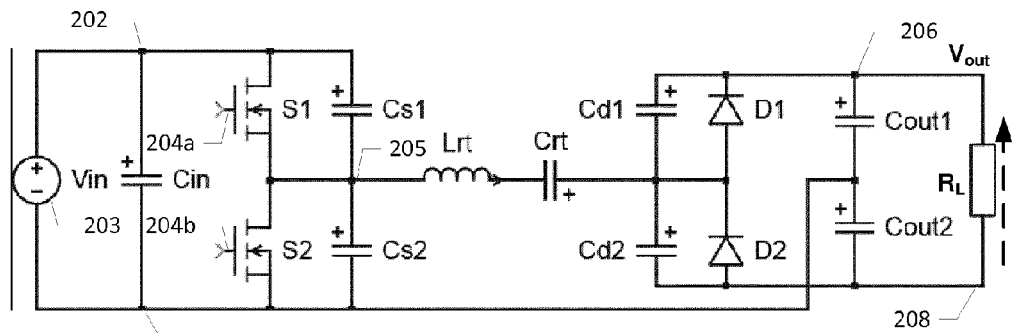
Figure 2:
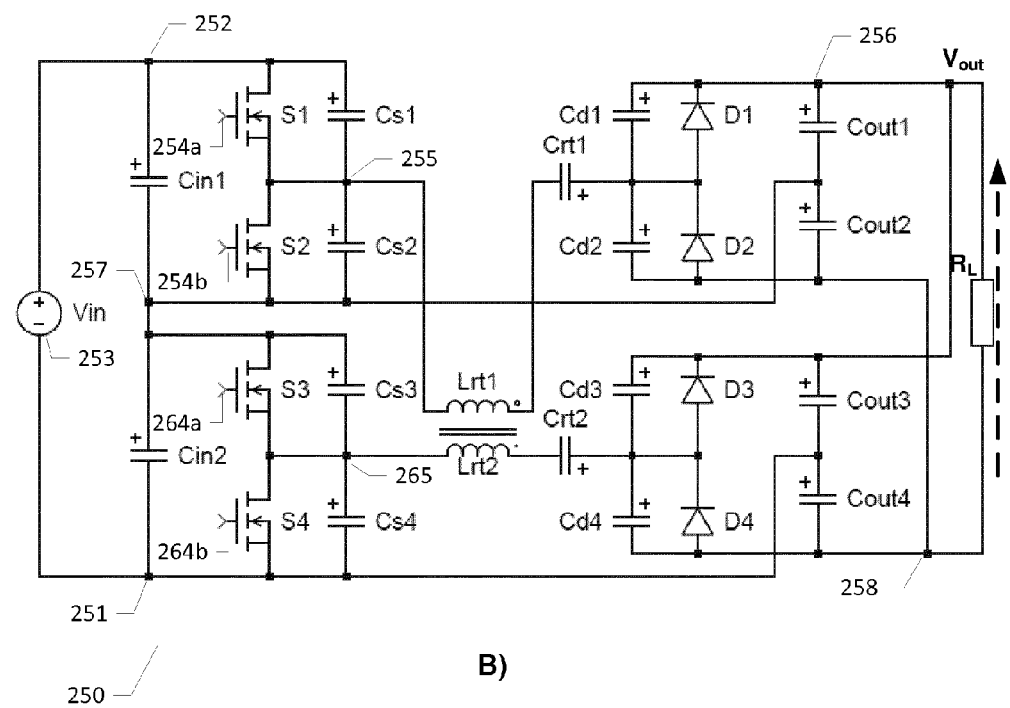

FIG. 2A) is a simplified electrical circuit diagram of a prior art resonant class DE DC-DC power converter 200 or class DE converter. The class DE converter 200 comprises an input side circuit and an output side circuit connected through a resonant network and a rectification circuit. The input side circuit comprises a positive input terminal 202 and a negative input terminal 201 for receipt of a DC or AC input voltage $V_{in}$ from a voltage or power source 203. An input capacitor Cin is electrically connected between the positive and negative input terminals 201, 202 to form an energy reservoir for the DC or AC input voltage source 203. A resonant network of the class DE converter 200 comprises at least the inductor Lrt, the capacitors Cs1, Cs2 and Crt and possibly capacitors Cd1 and Cd2. A controllable switch arrangement comprises a half-bridge inverter comprising first and second stacked semiconductor transistor switches S1 and S2. Each of the first and second semiconductor switches S1, S2 may comprise a transistor such as a MOSFET or IGBT, for example a Gallium Nitride (GaN) or Silicon Carbide (SiC) MOSFET.

An output node 205 of the half-bridge inverter is coupled to the resonant network. An input of the half-bridge inverter at a drain terminal of the semiconductor switch S1 is coupled to the voltage or power source 203. The half-bridge inverter accordingly generates an alternatingly increasing and decreasing resonant current in the resonant network in accordance with the respective switch control signals applied to the gates or control terminals 204a, 204b of the first and second semiconductor switches S1, S2. The alternating current flow in the resonant network follows the switch control signals. Each of the switch control signals forces the corresponding semiconductor transistor switch S1 or S2 to alternate between a conducting/on-state and a non-conducting/off-state at the frequency of the first switch control signal. The switch control signals are preferably in substantially opposite phase and both switch control signals have a switching frequency situated in close proximity to a resonance frequency of the resonant network. At least a portion of the resonant current in the resonant network generated by the state switching of semiconductor switches S1 and S2 is flowing from an output of the resonant network through the rectification circuit of the class DE converter 200 to produce a rectified output voltage across a pair of series connected rectification capacitors Cout1 and Cout2. The skilled person will appreciate that the residual portion of the resonant current in the resonant network may be oscillating between Cs and the input inductor Lin to allow or enable zero voltage switching (ZVS) conditions of the semiconductor transistor S. The rectification circuit comprises a rectifier inductor Lr, a diode D and a capacitor Cd coupled across the diode. Hence, the rectifier inductor Lr may form part of both the resonant network and the rectification circuit. A converter assembly load $R_L$ is connected to the generated output voltage $V_{out}$ at node 106 of the SEPIC 100 and schematically illustrated by a load resistor symbol.

FIG. 2B) is a simplified electrical circuit diagram of a resonant DC-DC power converter assembly 250 comprising a pair of coupled resonant class DE DC-DC power converters in accordance with a second embodiment of the invention. The resonant DC-DC power converter assembly 250 comprises a first class DE power converter built around a first controllable switch arrangement in form of a half-bridge inverter comprising first and second stacked semiconductor switches S1, S2 and a second class DE power converter built around a second controllable switch arrangement in form of a half-bridge inverter comprising third and fourth stacked semiconductor switches S3, S4. The first and second class DE power converters are interconnected, or mutually coupled, via first and second magnetically coupled inductors Lrt1 and Lrt2. Inductors Lrt1 and Lrt2 form part of the respective resonant networks of the first and second class DE power converters. The first and second magnetically coupled inductors Lrt1 and Lrt2 are arranged to force substantially 180 degrees phase shift between resonant voltage waveforms of the resonant networks such as the voltage waveforms supplied to the inputs of the rectification circuits, i.e. at the midpoint node between capacitances Cd1 and Cd2 and the midpoint node between capacitances Cd3 and Cd4. The open dot symbol at the inductor Lrt1 and the closed dot symbol at the inductor Lrt2 indicate that the windings of these inductors are arranged to produce this substantially opposite phase relationship between the resonant voltage waveforms at these terminals of the coupled inductors Lrt1 and Lrt2.

The first and second class DE power converters preferably possess the same circuit topology and may be substantially identical, i.e. having the same circuit topology and have identical component values within practical manufacturing tolerances. Hence, the magnetically coupled inductors Lrt1 and Lrt2 of the respective resonant networks are corresponding components or elements of the first and second class DE power converters. Each of the first and second class DE power converters may be substantially identical to the above-discussed prior art class DE converter 200. The coupled inductors Lrt1 and Lrt2 may be wound around a common magnetically permeable core material, e.g. soft iron material, to form a transformer. The transformer coupling of the input inductors Lin1 and Lin2 will typically lead to a high mutual magnetic coupling coefficient which is advantageous for forcing an accurate 180 degree phase shift between the corresponding resonant voltage waveforms of resonant networks. In practice, obtainable values of the mutual magnetic coupling coefficient will depend on practical constraints on the pair of magnetically coupled inductors Lrt1 and Lrt2 such as size, costs, winding technology etc. The value of the mutual magnetic coupling coefficient is nevertheless preferably larger than 0.1, even more preferably larger than 0.2, such as larger than 0.5. However, in other embodiments of the invention a satisfactory value of the mutual magnetic coupling coefficient between the inductors Lrt1 and Lrt2 may be achieved by an adjacent or interleaved arrangement of the respective coil windings without any common magnetically permeable core material for example employing the PCB integrated solenoid transformer structures disclosed in the applicant's co-pending European patent application No. 13198912.1.

The input side circuits of the first and second class DE power converters are coupled in series across the common input voltage or power source 253 delivering a DC or AC input voltage $V_{in}$ to the resonant DC-DC power converter assembly 250. The first input side circuit comprises an input capacitor Cin1 coupled between a positive and a negative input terminal 252, 253 of the first class DE power converter. The second input side circuit likewise comprises an input capacitor Cin2 coupled between a positive and a negative input terminal 253, 251 of the second class DE power converter. Consequently, provided that the capacitances of the input capacitors Cin1, Cin2 are largely the same, the input voltages to each of the first and second class DE power converters will be largely identical and one-half of the input voltage $V_{in}$.

The first resonant network comprises, in addition to the previously discussed inductor Lrt1, at least capacitors Cs1, Cs2 and Crt1 and possibly capacitors Cd1 and cd2 depending on the exact tuning of the rectification circuit. The skilled person will understand that capacitors Cs1, Cs2 may be formed by separate capacitors, i.e. external to switches S1 and S2, or be intrinsic drain-source capacitances of S1 and S2. External Cs1, Cs2 capacitors may function to increase a resonant current and/or adjust/fine-tune the resonance frequency of the resonant network of the first class DE power converter. Likewise, the capacitors Cd1, Cd2 arranged across first and second rectifying diodes D1, D2, respectively, may be used to adjust a duty cycle of the first class DE power converter. The rectification circuit is connected between an output of the first resonant network and an output node or terminal 256 which forms part of an output side circuit of the first class DE power converter. The rectification circuit further comprises a pair of series coupled smoothing capacitors Cout1, Cout2 connected between the output terminal 256 and a negative output terminal 258 of the power converter assembly 250. The output voltage of the first class DE power converter is supplied to a converter assembly load $R_L$, schematically illustrated by a load resistor symbol. This converter assembly load $R_L$ is shared between the first and second class DE power converters because an output side circuit of the second class DE power converter is coupled in parallel with the output side circuit of the first class DE power converter as illustrated. The output side circuit of the second class DE power converter comprises a second pair of series coupled smoothing capacitors Cout3, Cout3 connected between the output terminal 256 and the negative output terminal 258 of the power converter assembly such that series coupled smoothing capacitors Cout1, Cout2 are arranged in parallel with the series coupled smoothing capacitors Cout3, Cout4 across the converter assembly load $R_L$.

The converter assembly load $R_L$ may in practice include different types of electric loads of the resonant DC-DC power converter assembly 250 for example a set of LED diodes or a rechargeable battery etc. The circuit and components of the second class DE power converter are preferably substantially identical to the components of the first class DE power converter. The second class DE power converter therefore comprises a corresponding input side circuit, a corresponding second half-bridge inverter arrangement, e.g. comprising a pair of stacked MOSFET transistors (S3, S4), a corresponding second resonant network and a corresponding second rectification and output side circuit.

The half-bridge inverter (S1, S2) of the first class DE power converter drives the first resonant network via the driver output 255. The half-bridge inverter of the first class DE power converter is driven by a first pair of opposite phase switch control signals applied to respective ones of gate terminals 254a, 254b. The half-bridge inverter (S3, S4) of the second class DE power is driven by a second pair of opposite phase switch control signals applied to respective ones of gate terminals 264a, 264b. The first and second pairs of switch control signals for the first and second class DE power converters may be generated in different ways since preferably only one of the two class DE power converters is driven with an external "hard" switch control signal. The pair of switch control signal for the other class DE power converter is preferably generated via a self-oscillation loop (not shown). The first pair of switch control signals may be generated by a separate signal source for example by a suitable output voltage regulation loop or control circuit (not shown) and applied to the gate terminals 254a, 254b of the first half-bridge inverter. This first pair of switch control signals determines the switching frequency of the first class DE power converter and may for example be a frequency modulating control signal such that frequency control is used to adjust the converter assembly output voltage $V_{out}$ to a desired DC voltage level. The output voltage regulation loop may comprise feedback control and one or more a suitable DC reference voltage(s). Alternatively, the output voltage regulation loop may be configured for burst-mode or on-off control of the converter assembly output voltage $V_{out}$.

However, the self-oscillation feedback loop (not shown) of the second class DE power converter is coupled between the driver output 265 and the gate terminals 264a, 264b of the half-bridge inverter force the second class DE power converter to track or follow the operation of the first class DE power converter as a slave circuit. This means in particular that the switching frequency of the first class DE power converter set by the first "hard" driven pair of switch control signals on S1 and S2 is replicated to the second pair of switch control signals on the gate terminal 264a, 264b of the half-bridge inverter of the second power converter. Hence, the switching frequency of the second class DE power converter becomes substantially identical and synchronous to the switching frequency of the first class DE power converter. However, the corresponding resonant voltage waveforms of the first and second class DE power converters, such as the driver output voltages, are substantially 180 degrees out of phase due to the previously discussed orientation of the first and second magnetically coupled inductors Lrt1 and Lrt2. This feature can be appreciated by noting that when first half-bridge (S1) is switched to logic high (the driver output voltage clamped at the input source voltage) by the first "hard" driven pair of switch control signal, resonant current is forced through the first inductor Lrt1. The opposite phase coupling of Lrt2 forces an oppositely directed resonant current, with substantially same magnitude, through Lrt2. This oppositely directed resonant current initially activates the self-oscillation feedback loop around the second half-bridge inverter (S3, S4) such that the second class DE power converter starts to oscillate. Thereafter, the second driver output voltage at output 265 is aligned or synchronized with the first driver output voltage at output 255 by the resonant current induced in the second input inductor Lrt2 by the resonant current flow in the first inductor Lrt. The second driver output voltage controls in turn the second pair of switch control signal on the gate terminal 264a, 264b because of the coupling through the self-oscillation feedback loop. Finally, the corresponding voltage waveforms of the first and second rectification circuits are also forced into opposite phase as described in connection with the first embodiment of the invention and with the same benefits.

The frequency of the first pair of "hard" driven switch control signals applied to the gate terminals 254a, 254b of the first half-bridge inverter is preferably set to a frequency at or above 30 MHz to provide so-called VHF operation of the resonant DC-DC power converter assembly 250. The first pair of switch control signals may comprise a pair of opposite phase frequency modulated control signals as mentioned above. The skilled person will understand that the each of the first and second semiconductor switches S1, S2 and each of the third and fourth semiconductor switches S3, S4 may comprise a transistor such as a MOSFET or IGBT, for example a Gallium Nitride (GaN) or Silicon Carbide (SiC) MOSFET.

Figure 3:
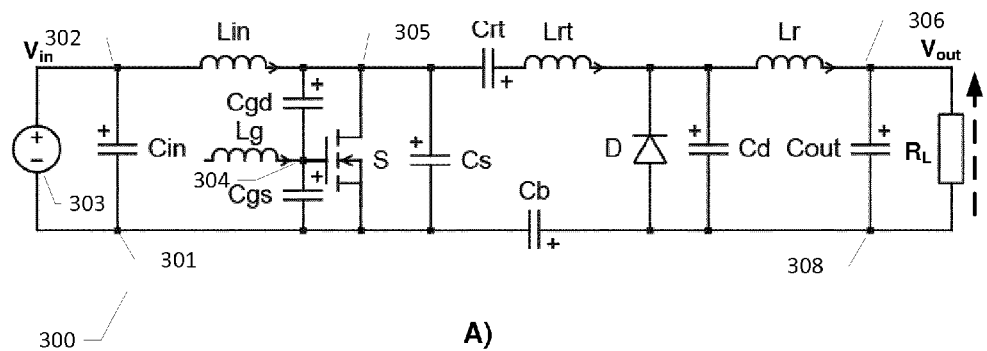
Figure 3:
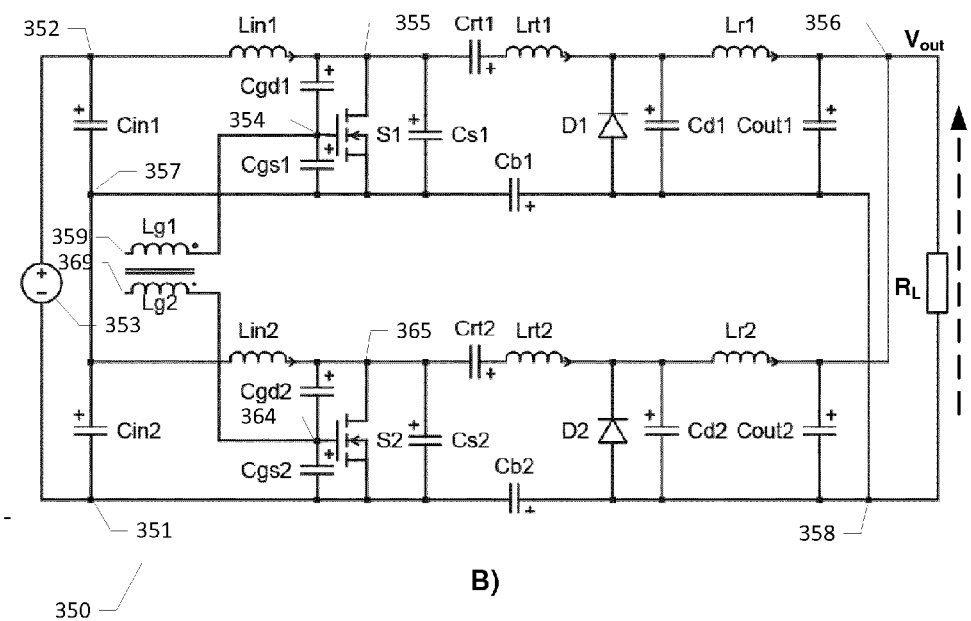

FIG. 3A) shows a simplified electrical circuit diagram of an isolated class E self-oscillating resonant DC-DC power converter 300 based on the self-oscillating class E resonant power converter described in FIGS. 1A) and 1B) and the accompanying description of the applicant's co-pending patent application PCT/EP2013/072548. The class E power converter 300 comprises an input side circuit and an output side circuit connected through a galvanic isolation barrier formed by series or coupling capacitors Crt and Cb. The input side circuit comprises a positive input terminal 302 and a negative input terminal 301 for receipt of a DC or AC input voltage $V_{in}$ from a voltage or power source 303. An input capacitor Cin is electrically connected between the positive and negative input terminals 301, 302 to form an energy reservoir for the DC or AC input voltage source. A resonant network of the class E power converter 300 comprises at least the input inductor Lin, capacitors Crt and Cs and a second inductor Lrt. An output of the resonant network is connected to a class E rectification circuit. The class E rectification circuit comprises a rectifier inductor Lr, a diode D and a capacitor Cd coupled across the diode. The class E rectification circuit also comprises a smoothing or rectification capacitance Cout which alternatively may be considered a part of the output side circuit. The class E rectification circuit generates a rectified converter output voltage $V_{out}$ across Cout between positive and negative output terminals 306, 308, respectively of the converter 300. A converter assembly load $R_L$ is connected to the generated output voltage $V_{out}$ across terminals 306, 308 of the class E power converter 300 as schematically illustrated by a load resistor symbol. An output 305 of a controllable switch arrangement, comprising a single controllable semiconductor transistor or switch S in this embodiment, is coupled to the resonant network. The semiconductor switch S accordingly generates an alternatingly increasing and decreasing resonant current in the resonant network in accordance with a switch control signal applied to the gate or control terminal 304 of the semiconductor switch S. The alternating current flow in the resonant network follows the switch control signal applied to the gate terminal 304 of semiconductor transistor switch S. The switch control signal forces the semiconductor transistor switch S to alternate between a conducting/on-state and a non-conducting/off-state at the frequency of the switch control signal. The frequency of the switch control signal is preferably selected such that it is situated in close proximity to a resonance frequency of the resonant network. At least a portion of the resonant current in the resonant network generated by the state switching of semiconductor transistor S is flowing from an output of the resonant network through the rectification circuit of the output side circuit of the SEPIC converter 100 to produce a rectified output voltage across a rectification capacitance Cout. The skilled person will appreciate that the residual portion of the resonant current in the resonant network may be oscillating between Cs and the input inductor Lin to allow or enable zero voltage switching (ZVS) operating conditions of the semiconductor switch S.

The class E power converter 300 comprises a self-oscillation feedback loop coupled between the output, i.e. a drain terminal when S is a MOSFET, of the semiconductor switch S and the control terminal 304. The self-oscillation feedback loop comprises a capacitor Cgd connected from the output 305 or drain terminal of the semiconductor switch S and the gate terminal 304. The self-oscillation feedback loop additionally comprises a gate inductor Lg having a first end coupled to the gate terminal 304 of semiconductor switch S. The self-oscillation feedback loop may additionally comprise a first bias voltage source which is configured to generate a first adjustable bias voltage. The first adjustable bias voltage is coupled to the second end of the gate inductor Lg. The gate inductor Lg preferably has a substantially fixed inductance. The operation principle and details of the components of this self-oscillation feedback loop are described in the applicant's co-pending patent application PCT/EP2013/072548 and may be incorporated in the class E power converters and power converter assemblies incorporating the same in accordance with the present invention. The frequency and possibly duty cycle of the switch control signal on the gate terminal 304 of semiconductor switch S is accordingly determined by the operation of the self-oscillation feedback loop. The frequency and possibly duty cycle of the switch control signal can be controlled by controlling the voltage of the first adjustable bias voltage for example via suitable output voltage regulation loop.

FIG. 3B) is a simplified electrical circuit diagram of a resonant DC-DC power converter assembly 350 comprising first and second magnetically coupled isolated class E self-oscillating resonant DC-DC power converters in accordance with a third embodiment of the invention. The resonant DC-DC power converter assembly 350 comprises a first self-oscillating class E power converter built around a first controllable switch arrangement in form of a single semiconductor switch S1 and a substantially identical second self-oscillating class E power converter built around a second controllable semiconductor switch S2. The skilled person will understand that each of the first and second self-oscillating class E power converters may be substantially identical to the above-discussed self-oscillating class E power converter 300. The semiconductor switch S1 of the first class E power converter drives a first resonant network via a driver output 355 or drain terminal. The semiconductor switch S1 is driven by a first self-oscillation feedback loop extending from the drain or output 355 of S1 to the gate terminal 354 of S1. The semiconductor switch S2 of the second class E power converter drives the second resonant network via the driver output 365 or drain terminal. The semiconductor switch S2 is driven by the second self-oscillation feedback loop extending from the drain or output 365 of S2 to the gate terminal 364 of S2. Input side circuits of the first and second self-oscillating class DE power converters are coupled in series across the common voltage or power source 353 delivering a DC or AC input voltage $V_{in}$ across positive and negative input terminals 352, 351, respectively, of the resonant DC-DC power converter assembly 350. The input side circuits also comprise first and second cascaded input capacitors Cin1, Cin2 coupled between the positive and negative input terminals 352, 351. Consequently, provided that the input capacitors Cin1, Cin2 have largely identical capacitances, the input voltage to each of the first and second class DE power converters will be largely identical and equal to one-half of the input voltage $V_{in}$. The first and second self-oscillating class E power converters are interconnected, or coupled, via first and second magnetically coupled inductors Lgt1 and Lg2. The inductors Lg1 and Lg2 form part of the first and second self-oscillation feedback loop, respectively, of the first and second class E power converters. The first and second magnetically coupled inductors Lg1 and Lg2 are arranged to force substantially 180 degrees phase shift between the corresponding resonant voltage waveforms of the resonant networks of the first and second self-oscillating class E power converters. The arrangement and orientation of the inductors Lg1, Lg2, coupled in series with the gates of the first and second controllable semiconductor switches S1, S2, respectively, force approximately 180 degrees phase shift between the first and second switch control signals applied to the gate terminals 354, 364, respectively. This also forces 180 degrees phase shift between other corresponding circuit voltages than the above-discussed corresponding resonant voltage waveforms of the resonant networks such as the voltage waveforms supplied to the inputs of the rectification circuits, i.e. at the coupling nodes between Cd1, Lr1 and Cd2, Lr2 in the first and second self-oscillating class E power converters. The open dot symbol at the inductor Lg1 and the closed dot symbol at the inductor Lg2 indicate that the windings of these inductors are arranged to produce this opposite phase relationship between the switch control signals at the gate terminals, 354, 364.

The coupled gate inductors Lg1 and Lg2 may be wound around a common magnetically permeable core material, e.g. soft iron material, to form a transformer. The transformer coupling of the inductors Lg1 and Lg2 will typically lead to a high mutual magnetic coupling coefficient which is advantageous for forcing an accurate 180 degree phase shift between the corresponding resonant voltage waveforms, i.e. the switch control signals or voltages, at the gate terminals 354, 364. In practice, obtainable values of the mutual magnetic coupling coefficient will depend on the previously discussed practical constraints. The value of the mutual magnetic coupling coefficient is nevertheless preferably larger than 0.1, even more preferably larger than 0.2, such as larger than 0.5. However, in other embodiments of the invention a satisfactory value of the mutual magnetic coupling coefficient between the gate inductors Lg1 and Lg2 may be achieved by an adjacent or interleaved arrangement of the respective coil windings without any common magnetically permeable core material for example employing the PCB integrated solenoid transformer structures disclosed in the applicant's co-pending European patent application No. 13198912.1. The skilled person will understand that additional pairs of corresponding inductors, such as input inductors Lin1, Lin2 of the first and second resonant networks, respectively, of the first and second class E converters may be magnetically coupled to each other in addition to the mutual magnetic coupling between the first and second gate inductors Lg1 and Lg2 as discussed below in further detail with reference to FIG. 4.

The input side circuits of the first and second class DE power converters are coupled in series across the common voltage or power source 353 delivering a DC or AC input voltage $V_{in}$ to the resonant DC-DC power converter assembly 350. The first input side circuit comprises an input capacitor Cin1 coupled between a positive and a negative input terminal 352, 357 of the first class E power converter. The second input side circuit likewise comprises an input capacitor Cin2 coupled between positive and negative input terminals 357, 351, respectively, of the second class E power converter. Consequently, provided that the input capacitors Cin1, Cin2 have largely identical capacitances, the input voltages to each of the first and second class DE power converters will be largely identical and equal to one-half of the input voltage $V_{in}$.

The skilled person will understand that capacitors Cgd1, Cgs1 and Cs1 may be formed by separate capacitors, i.e. external to S1 or be intrinsic gate-drain, gate-source and drain-source capacitances of S1. The same applies to the corresponding capacitors Cgd2, Cgs2 and Cs2 of S2. The capacitance of Cgd1 may be configured to provide sufficient loop gain of the first self-oscillation feedback loop from the drain of S1 to the gate terminal of S1 to enable self-oscillation of S1. The rectification circuit is connected between an output of the first resonant network and an output node or terminal 356 which forms part of an output side circuit of the first class E power converter. The rectification circuit further comprises a smoothing capacitor Cout1 connected between the output terminal of 356 and a negative output terminal 358 of the power converter assembly. The output voltage of the first class E power converter is supplied to a converter assembly load $R_L$, schematically illustrated by a load resistor symbol. This converter assembly load $R_L$ is shared between the first and second class E power converters because an output side circuit of the second class E power converter is coupled in parallel with the output side circuit of the first class DE power converter as illustrated. The converter assembly output voltage $V_{out}$ is accordingly identical to the first and second output voltages of the first and second class E power converters, respectively, in the present embodiment with parallel output side circuits. The output side circuit of the second class E power converter comprises a second smoothing capacitor Cout2 connected between the positive and negative output terminals 356, 358 of the power converter assembly such that Cout1 and Cout2 are coupled in parallel across the converter assembly load $R_L$. The converter assembly load $R_L$ may in practice include different types of electric loads of the resonant DC-DC power converter assembly 350 for example a set of LED diodes or a rechargeable battery etc. The circuit and components of the second class E power converter are preferably substantially identical to the components of the first class E power converter.

The converter assembly output voltage $V_{out}$ may be adjusted to a desired or reference DC voltage level by an output voltage regulation loop as discussed in detail below with reference to FIG. 4. The output voltage regulation loop may comprise feedback control and one or more a suitable DC reference voltage(s). The output voltage regulation loop may be configured for frequency modulation, burst-mode or on-off control of the converter assembly output voltage $V_{out}$. In one embodiment, the converter assembly output voltage $V_{out}$ is controlled by adjusting respective adjustable bias voltages applied to the free ends 359, 369, of the first and second gate inductors Lg1, Lg2. These adjustable bias voltages are preferably configured such that substantially identical gate-source voltages are applied to S1 and S2 to allow tracking operation of the first and second Class E power converters. This means that the switching frequencies of the first and second class E power converters become substantially identical and synchronous albeit substantially 180 degrees out of phase. The switching frequency of each class E converter is preferably set to a frequency at or above 30 MHz to provide so-called VHF operation of the resonant DC-DC power converter assembly 350. This may be accomplished by appropriate design of the first and second self-oscillation feedback loops. The skilled person will understand that the each of the first and second semiconductor switches S1, S2 may comprise a transistor such as a MOSFET or IGBT, for example a Gallium Nitride (GaN) or Silicon Carbide (SiC) MOSFET.

Figure 4:
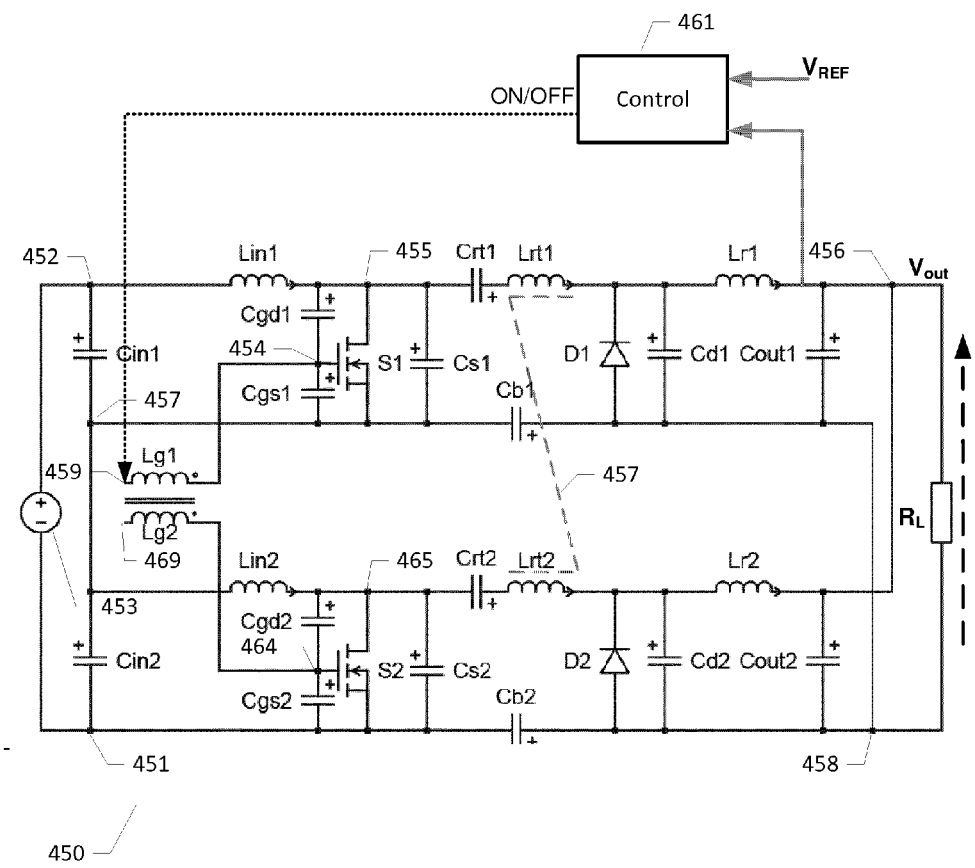
FIG. 4 shows a simplified electrical circuit diagram of a resonant DC-DC power converter assembly comprising first and second magnetically coupled isolated class E self-oscillating resonant DC-DC power converters in accordance with a fourth embodiment of the invention.

FIG. 4 is a simplified electrical circuit diagram of a resonant DC-DC power converter assembly 450 comprising first and second magnetically coupled isolated class E self-oscillating resonant DC-DC power converters in accordance with a fourth embodiment of the invention. Corresponding features and components of the resonant DC-DC power converter assembly 350 are discussed above and the present resonant DC-DC power converter assembly 450 has been provided with corresponding reference numeral to ease comparison. The skilled person will understand that the characteristics of the components of the present resonant DC-DC power converter assembly 450 may be identical to the characteristics of the corresponding components of the DC-DC power converter assembly 350 discussed above. In addition to the features of the DC-DC power converter assembly 350, the present power converter assembly 450 comprises an output voltage regulation loop connected exclusively to the first class E power converter. The present power converter assembly 450 furthermore comprises two separate pairs of magnetically coupled inductors instead of the single pair of magnetically coupled inductors (the first and second gate inductors Lg1 and Lg2) of the resonant DC-DC power converter assembly 350 discussed above. The first pair of magnetically coupled inductors comprises gate inductors Lg1 and Lg2. The arrangement and orientation of the gate inductors Lg1, Lg2 are configured to force approximately 180 degrees phase shift between the first and second switch control signals applied to the gate terminals 454, 464, respectively, as discussed above in respect of the DC-DC power converter assembly 350. The second pair of magnetically coupled inductors (schematically indicated on the drawing by coupling symbol 457) comprises the corresponding inductors Lrt1 and Lrt2 of the first and second class E self-oscillating resonant DC-DC power converters. The inductor Lrt1 forms part of the resonant network of the first class E power converter built around a first semiconductor switch S1 and the inductor Lrt2 forms part of the resonant network of the second class E power converter built around a second semiconductor switch S2. The arrangement and orientation of the inductors Lrt1, Lrt2 are configured to force approximately 180 degrees phase shift between the resonant voltages and currents flowing in the respective resonant networks of the first and second class E power converters. Hence, both pairs of magnetically coupled inductors cooperate to force the substantially 180 degrees phase shift between corresponding resonant voltage waveforms of the first and second class E power converters.

The magnetic coupling between multiple pairs, i.e. two or more pairs, of corresponding inductors of the first and second resonant DC-DC power converters, or resonant power inverters, is particularly advantageous for resonant power converters operating at very high switching frequencies such as switching frequencies at or above 20 MHz, or switching frequencies in the VHF range at or above 30 MHz. This is because it is impractical, or impossible, to use magnetically permeable core material to provide the magnetic coupling of the inductor pair or pairs in question at these high switching frequencies. The unavailability of the magnetically permeable core material will often lead to a relatively small mutual magnetic coupling coefficient between the inductors of the coupled inductor pair which in turn leads to a smaller degree of coupling between the first and second resonant DC-DC power converters, or resonant power inverters, than desired. Hence, by using multiple pairs of coupled inductors, where each pair of corresponding inductors are magnetically coupled to each other, the overall magnetic coupling between the first and second resonant DC-DC power converters, or resonant power inverters, is increased compared to the coupling effected by a single pair of magnetically coupled inductors. This increased coupling factor between the first and second resonant DC-DC power converters, or resonant power inverters, is generally advantageous for numerous reasons for example because a high coupling factor forces a more accurate 0 degree, or 180 degree, as the case may be, phase relationship between the corresponding resonant current and voltage waveforms of the first and second resonant DC-DC power converters, or resonant power inverters. The increase of coupling between the first and second resonant DC-DC power converters, or resonant power inverters, is also beneficial in connection with a master-slave coupling of the first and second resonant DC-DC power converters discussed below. This is because the higher coupling factor forces the slave converter to more accurately track the master converter and thereby align switching frequencies and phase.

The output voltage regulation loop comprises a feedback control circuit 461 which has a first input connected to a DC reference voltage $V_{REF}$. The feedback control circuit 461 comprises a second input that is coupled to the converter assembly output voltage $V_{out}$. The feedback control circuit 461 is configured to generate a two-level control voltage to the free end 459 of the first gate inductor Lg1 of the first class E power converter. The two-level control voltage is preferably switched between two discrete DC voltage levels wherein a first DC voltage level is sufficiently small to turn-off the first semiconductor switch S1 and thereby interrupt oscillation of the feedback loop formed around S1 as discussed above. The second DC voltage level is sufficiently high to turn-on the first semiconductor switch S1 and activate self-oscillation of the feedback loop formed around S1. The converter assembly output voltage $V_{out}$ may be adjusted by alternatingly activating and deactivating the self-oscillation of the first class E power converter as needed to reach a particular target value of the converter assembly output voltage $V_{out}$. This regulation methodology is often referred to as ON/OFF control. The second class E power converter preferably lacks a corresponding output voltage regulation loop and is instead configured to track the operational state, i.e. ON or OFF, of the first class E power converter due to the above discussed magnetic coupling between the corresponding inductor pair of pairs of the first and second class E power converters. In this manner, the second class E power converter is configured as a slave circuit to the first class E power converter. This means that the switching frequencies and the corresponding resonant voltage/current waveforms of the first and second class E power converters are substantially identical and synchronous albeit phase shifted about 180 degrees relative to each other.

Figure 5:
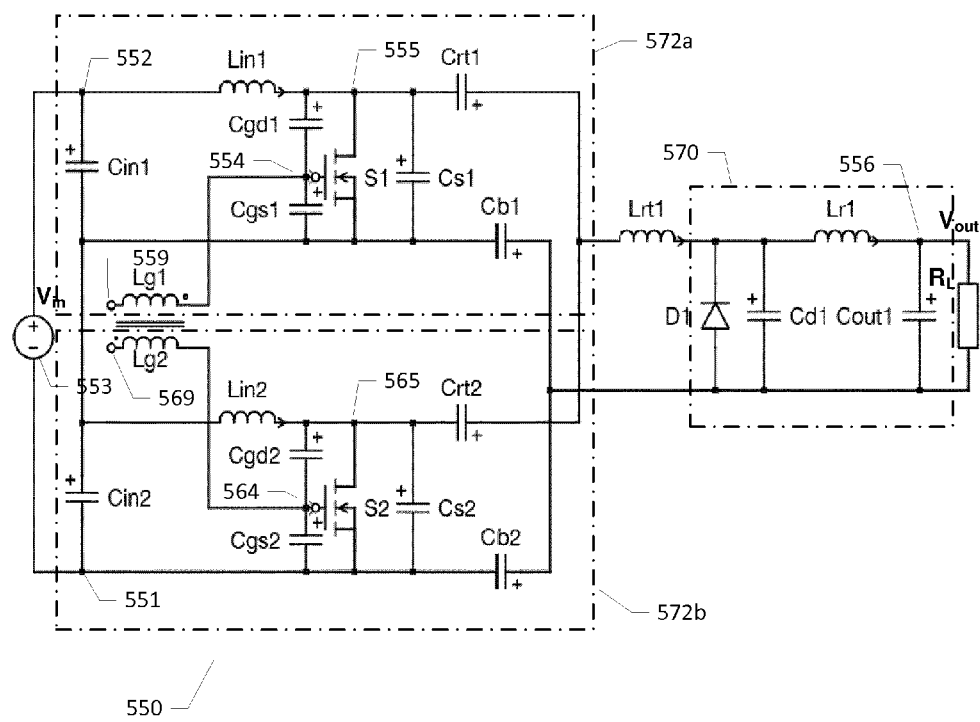
FIG. 5 is a simplified electrical circuit diagram of a resonant DC-DC power converter assembly comprising first and second magnetically coupled resonant isolated class E inverters with a common rectification circuit in accordance with a fifth embodiment of the invention.

FIG. 5 is a simplified electrical circuit diagram of a resonant DC-DC power converter assembly 550 comprising first and second magnetically coupled resonant isolated class E inverters 572a, 572b connected to a common rectification circuit 570 in accordance with a fifth embodiment of the invention. Hence, a first resonant DC-DC power converter is formed by the first resonant isolated class E inverter 572a in conjunction with common rectification circuit 570 and a second resonant DC-DC power converter is formed by the second resonant isolated class E inverter 572b in conjunction with common rectification circuit 570. The common rectification circuit 570 has a class E topology and comprises inductor Lr1, a capacitor Cd1, a diode D1 and output or filter capacitor Cout1. The output voltage $V_{out}$ of the common rectification circuit 570 is connected to a converter assembly load $R_L$. The galvanic isolation of the first resonant isolated class E inverter 572a is provided by a first galvanic isolation barrier formed by series or coupling capacitors Crt1 and Cb1 and the second resonant isolated class E inverter 572b comprises similar galvanic isolation barrier formed by series or coupling capacitors Crt2 and Cb2. Corresponding features and components of the resonant DC-DC power converter assembly 350 discussed above and the present resonant DC-DC power converter assembly 550 have been provided with corresponding reference numeral to ease comparison. The skilled person will understand that characteristics of the components of the present resonant DC-DC power converter assembly 550 may be identical to the characteristics of the corresponding components of the DC-DC power converter assembly 350 discussed above. A significant difference between the DC-DC power converter assembly 350 and the present resonant DC-DC power converter assembly 550 is the phase of the magnetic coupling between the first and second gate inductors Lg1 and Lg2 coupled in series with the gates of the first and second controllable semiconductor switches S1, S2, respectively. In the present resonant DC-DC power converter assembly 550, the first and second gate inductors Lg1 and Lg2 are arranged or oriented to force substantially 0 degree phase shift, rather than the 180 degrees phase shift discussed above, between the corresponding resonant voltage and current waveforms of the resonant isolated class E inverters 572a, 572b. The arrangement and orientation of the gate series inductors Lg1, Lg2 force approximately 0 degree phase shift between the first and second switch control signals applied to the gate terminals 554, 564, respectively, of the first and second controllable semiconductor switches S1, S2. The 0 degree phase shift between the corresponding resonant voltage and current waveforms of the resonant isolated class E inverters 572a, 572b allows the respective output voltages of the first and second resonant networks, comprising Crt1, Crt2 and Lrt1, to be combined or added at the input of the common rectification circuit 570 because of their in-phase relationship. The skilled person will understand that the first and second resonant networks share the resonant inductor Lrt1. This inductor sharing decreases the component count of the resonant DC-DC power converter assembly 550 and has the additional benefit that the inductance of Lrt1, and hence its approximate size, can be halved compared to the value of separate inductors of two separate resonant network. Finally, the first and second input inductors Lin1 and Lin2 of the first and second resonant isolated class E inverters 572a, 572b, respectively, may alternatively, or additionally for the reasons discussed above, be magnetically coupled to each other to force, or reinforce, the substantially 0 degree phase shift between the corresponding resonant voltage and current waveforms of the resonant isolated class E inverters 572a, 572b.

Figure 6:
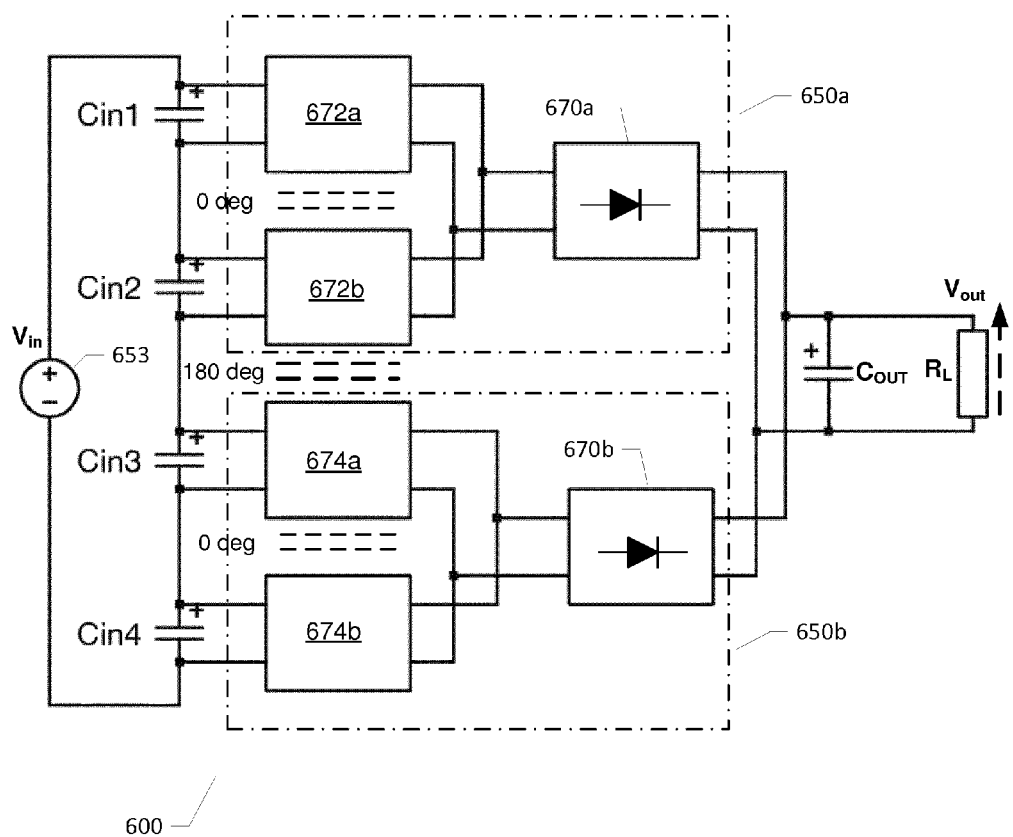
FIG. 6 is a schematic block diagram of a multi-stage resonant DC-DC power converter assembly comprising magnetically coupled first and second resonant DC-DC power converter assemblies in accordance with a sixth embodiment of the invention.

FIG. 6 is a schematic block diagram of a multi-stage resonant DC-DC power converter assembly 600 comprising magnetically coupled first and second resonant DC-DC power converter assemblies 650a, 650b in accordance with a sixth embodiment of the invention. The multi-stage resonant DC-DC power converter assembly 650 comprises four resonant power inverters 672a, 672b, 674a, 674b having respective input circuits coupled in series across a DC or AC input voltage or power source 653. The first resonant DC-DC power converter assembly 650a comprises a first pair of magnetically coupled power inverters 672a, 672b having respective outputs coupled to a common rectification circuit 670a similar to the coupling between the first and second magnetically coupled resonant isolated class E inverters 572a, 572b connected to a common rectification circuit 570 as discussed in connection with FIG. 5. The second resonant DC-DC power converter assembly 650b comprises a second pair of magnetically coupled power inverters 674a, 674b having respective outputs coupled to a common rectification circuit 670b in a corresponding manner. The respective output voltages of the first and second resonant DC-DC power converter assemblies are combined or added across a filter capacitor $C_{OUT}$ to form a converter assembly output voltage $V_{out}$ across a converter assembly load $R_L$. The in-phase magnetic coupling between the first pair of magnetically coupled power inverters 672a, 672b is schematically illustrated by the "0 deg" symbol and the in-phase magnetic coupling between the second pair of magnetically coupled power inverters 674a, 674b is illustrated schematically in the same manner.

The first resonant DC-DC power converter assembly 650a further comprises at least one inductor that is magnetically coupled to a corresponding inductor of the second resonant DC-DC power converter assembly 650b to force substantially 180 degrees phase shift between corresponding resonant voltage waveforms of the first and second resonant DC-DC power converter assemblies 650a, 650b. The antiphase (180 degrees phase shift) magnetic coupling between the first and second resonant DC-DC power converters is schematically illustrated by the "180 deg" symbol on the schematic diagram. The skilled person will appreciate that the multiple different circuit topologies of the resonant power inverters 672a, 672b, 674a, 674b may be utilized and comprise conventional inverter topologies such as class E, class F, class DE or SEPIC etc. In one embodiment, each of the resonant power inverters 672a, 672b, 674a, 674b is identical to the resonant isolated class E inverter 572a or 572b discussed above. The at least one inductor of the first resonant DC-DC power converter assembly 650a may for example be the first gate inductor Lg1 of the resonant isolated class E inverter 572a which is magnetically coupled to a corresponding gate inductor Lg1a (not shown) of the second resonant DC-DC power converter assembly 650b. Alternatively, the at least one inductor of the first resonant DC-DC power converter assembly 650a may comprise the first input inductor Lin1, or the common resonant network inductor Lrt1, which is magnetically coupled to a corresponding input inductor or resonant network inductor (not shown) of the second resonant DC-DC power converter assembly 650b. Finally, the skilled person will appreciate that one or more resonant DC-DC power converter assemblies may be coupled to the multi-stage resonant DC-DC power converter assembly 600 in a corresponding manner to the second resonant DC-DC power converter assembly 650b.

The invention claimed is:

1. A resonant DC-DC power converter assembly comprising:
   a first resonant DC-DC power converter and a second resonant DC-DC power converter having identical circuit topologies,
   a first inductor of the first resonant DC-DC power converter and a second inductor of the second resonant DC-DC power converter, which are configured to magnetically couple the first and second resonant DC-DC power converters to each other thereby forcing a substantially 180 degree phase shift, or forcing a substantially 0 degree phase shift, between corresponding resonant voltage waveforms of the first and second resonant DC-DC power converters,
   wherein the first and second inductors are corresponding components of the first and second resonant DC-DC power converters,
   wherein the first resonant DC-DC power converter comprises:
      a first input side circuit comprising a positive input terminal and a negative input-terminal for receipt of a first input voltage,
      a first controllable switch arrangement driven by a first switch control signal to set a switching frequency of the first converter,
      a first resonant network coupled to an output of the first controllable switch arrangement to generate alternatively increasing and decreasing resonant current in the first resonant network in accordance with the first switch control signal, a first rectification circuit connected to an output of the first resonant network, wherein the second resonant DC-DC power converter comprises:
a second input side circuit comprising a positive and a negative input terminals for receipt of the first input voltage or a second input voltage,
a second controllable switch arrangement driven by a second switch control signal to set a switching frequency of the second converter, and
a second resonant network coupled to an output of the second controllable switch arrangement to generate alternatively increasing and decreasing resonant current in the second resonant network in accordance with the second switch control signal;
wherein an output of the second resonant network is connected to the first rectification circuit or connected to a second rectification circuit,
wherein the first inductor is arranged in series with a control terminal of the first controllable switch arrangement, and
wherein the second inductor is arranged in series with a control terminal of the second controllable switch arrangement so as to force a substantially 180 degree phase shift between the first switch control signal and the second switch control signal or force a substantially 0 degree phase shift between the first switch control signal and the second switch control signal.

2. The resonant DC-DC power converter assembly according to claim 1, wherein the first and second inductors are configured to force the substantially 180 degree phase shift between the corresponding resonant voltage waveforms of the first and second resonant DC-DC power converters, and
the output of the second resonant network is connected to the second rectification circuit to generate a first converter output voltage at an output of the first rectification circuit and generate a second converter output voltage at an output of the second rectification circuit.

3. The resonant DC-DC power converter assembly according to claim 2, wherein the first converter output voltage of the first resonant DC-DC power converter and the second converter output voltage of the second resonant DC-DC power converter are coupled in series across a converter assembly load.

4. The resonant DC-DC power converter assembly according to claim 1, wherein the positive and negative input terminals of the first resonant DC-DC power converter and the positive and negative input terminals of the second resonant DC-DC power converter are coupled in series across a common AC or DC input voltage source.

5. The resonant DC-DC power converter assembly according to claim 1, wherein the positive and negative input terminals of the first resonant DC-DC power converter and the positive and negative input terminals of the second resonant DC-DC power converter are coupled in parallel to a common AC or DC input voltage source.

6. The resonant DC-DC power converter assembly according to claim 1, wherein a first converter output voltage of the first resonant DC-DC power converter and a second converter output voltage of the second resonant DC-DC power converter are coupled in parallel to a converter assembly load.

7. The resonant DC-DC power converter assembly according to claim 1, wherein the first controllable switch arrangement comprises one or more semiconductor switches and the second controllable switch arrangement comprises one or more semiconductor switches;
wherein each of the semiconductor switches comprises a semiconductor transistor, a MOSFET or an IGBT.

8. A resonant DC-DC power converter assembly comprising:
a first resonant DC-DC power converter and a second resonant DC-DC power converter having identical circuit topologies,
a first inductor of the first resonant DC-DC power converter and a second inductor of the second resonant DC-DC power converter, which are configured to magnetically couple the first and second resonant DC-DC power converters to each other thereby forcing a substantially 180 degree phase shift, or forcing a substantially 0 degree phase shift, between corresponding resonant voltage waveforms of the first and second resonant DC-DC power converters,
wherein the first and second inductors are corresponding components of the first and second resonant DC-DC power converters,
wherein the first resonant DC-DC power converter comprises a first self-oscillation feedback loop coupled between an output of a first controllable switch arrangement and a control terminal of the first controllable switch arrangement,
wherein the second resonant DC-DC power converter comprises a second self-oscillation feedback loop coupled between an output of a second controllable switch arrangement and a control terminal of the second controllable switch arrangement, and
wherein at least one of the first and second self-oscillation feedback loops comprises:
a first bias voltage source configured to generate a first adjustable bias voltage, and
a first inductor, having a substantially fixed inductance, coupled in-between the first bias voltage source and the control terminal of the first or the second controllable switch arrangement.

9. A resonant DC-DC power converter assembly comprising:
a first resonant DC-DC power converter and a second resonant DC-DC power converter having identical circuit topologies,
a first inductor of the first resonant DC-DC power converter and a second inductor of the second resonant DC-DC power converter, which are configured to magnetically couple the first and second resonant DC-DC power converters to each other thereby forcing a substantially 180 degree phase shift, or forcing a substantially 0 degree phase shift, between corresponding resonant voltage waveforms of the first and second resonant DC-DC power converters,
wherein the first and second inductors are corresponding components of the first and second resonant DC-DC power converters,
wherein the first inductor of the first and second magnetically coupled inductors has a quality factor (Q factor) larger than 5 or larger than 25, at a resonance frequency of a first resonant network and the second inductor of the first and second magnetically coupled inductors has a Q factor larger than 5, or larger than 25, at a resonance frequency of a second resonant network.

10. The resonant DC-DC power converter assembly according to claim 9, wherein the first and second inductors are configured to force the substantially 0 degree phase shift between the corresponding resonant voltage waveforms of the first and second resonant DC-DC power converters, and
an output of the second resonant network is connected to a first rectification circuit for sharing the first rectification circuit between the first and second resonant DC-DC power converters.

11. The resonant DC-DC power converter assembly according to claim 10, comprising:
an output side circuit coupled to an output of the first rectification circuit; wherein the output side circuit comprises positive and negative output terminals for supply of a converter output voltage and connection to a converter assembly load.

12. The resonant DC-DC power converter assembly according to claim 9, wherein the first resonant DC-DC power converter comprises a first self-oscillation feedback loop; and
the second resonant DC-DC power converter comprises an output voltage regulation loop generating the second switch control signal to adjust an output voltage across a converter assembly load.

13. The resonant DC-DC power converter assembly according to claim 12, wherein the output voltage regulation loop comprises one or more DC reference voltage(s).

14. A resonant DC-DC power converter assembly comprising:
a first resonant DC-DC power converter and a second resonant DC-DC power converter having identical circuit topologies,
a first inductor of the first resonant DC-DC power converter and a second inductor of the second resonant DC-DC power converter, which are configured to magnetically couple the first and second resonant DC-DC power converters to each other thereby forcing a substantially 180 degree phase shift, or forcing a substantially 0 degree phase shift, between corresponding resonant voltage waveforms of the first and second resonant DC-DC power converters,
wherein the first and second inductors are corresponding components of the first and second resonant DC-DC power converters,
wherein the first and second resonant DC-DC power converters further comprises corresponding third and fourth inductors, and
wherein the corresponding third and fourth inductors, which are magnetically coupled to each other, force a substantially 180 degree phase shift, or force a substantially 0 degree phase shift, between corresponding voltage and/or current waveforms of the corresponding third and fourth inductors.

15. A resonant DC-DC power converter assembly comprising:
a first resonant DC-DC power converter and a second resonant DC-DC power converter having identical circuit topologies,
a first inductor of the first resonant DC-DC power converter and a second inductor of the second resonant DC-DC power converter, which are configured to magnetically couple the first and second resonant DC-DC power converters to each other thereby forcing a substantially 180 degree phase shift, or forcing a substantially 0 degree phase shift, between corresponding resonant voltage waveforms of the first and second resonant DC-DC power converters,
wherein the first and second inductors are corresponding components of the first and second resonant DC-DC power converters, and
one or more additional resonant DC-DC power converter(s) each comprising:
an inductor, which is magnetically coupled to the first and second magnetically coupled inductors and is arranged to force a substantially 180 degree phase shift, or force a substantially 0 degree phase shift, between corresponding resonant voltage waveforms of the one or more additional resonant DC-DC power converters and the resonant voltage waveforms of one of the first and second resonant DC-DC power converters.

* * * * *